United States Patent
Fiorani et al.

(10) Patent No.: US 11,399,358 B2
(45) Date of Patent: Jul. 26, 2022

(54) RADIO NETWORK NODE, USER PLANE FUNCTION (UPF) AND METHODS PERFORMED THEREIN FOR PAGING POLICY DIFFERENTIATION

(71) Applicant: Telefonaktiebolaget LM Ericsson (publ), Stockholm (SE)

(72) Inventors: Matteo Fiorani, Solna (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 175 days.

(21) Appl. No.: 16/492,362

(22) PCT Filed: Jun. 25, 2019

(86) PCT No.: PCT/SE2019/050610
§ 371 (c)(1),
(2) Date: Sep. 9, 2019

(87) PCT Pub. No.: WO2020/005143
PCT Pub. Date: Jan. 2, 2020

(65) Prior Publication Data
US 2021/0337506 A1    Oct. 28, 2021

Related U.S. Application Data

(60) Provisional application No. 62/689,289, filed on Jun. 25, 2018.

(51) Int. Cl.
*H04W 68/00* (2009.01)
*H04W 4/00* (2018.01)
(Continued)

(52) U.S. Cl.
CPC ....... *H04W 68/02* (2013.01); *H04W 28/0268* (2013.01); *H04W 68/005* (2013.01); *H04W 80/02* (2013.01)

(58) Field of Classification Search
CPC ............. H04W 68/02; H04W 28/0268; H04W 68/005; H04W 80/02
(Continued)

(56) References Cited

U.S. PATENT DOCUMENTS

| | | | |
|---|---|---|---|
| 2018/0198867 A1* | 7/2018 | Dao | H04L 67/143 |
| 2019/0007992 A1* | 1/2019 | Kim | H04W 64/006 |
| 2021/0022112 A1 | 1/2021 | Deng | |

FOREIGN PATENT DOCUMENTS

| | | |
|---|---|---|
| EP | 3085189 A1 | 10/2016 |
| JP | 2021513785 A | 5/2021 |

(Continued)

OTHER PUBLICATIONS

3GPP, "3rd Generation Partnership Project; Technical Specification Group Radio Access Network; NG-RAN; E1 application protocol (E1AP) (Release 15)", 3GPP TS 38.463 V1 0.0, Jun. 2018, pp. 1-132.

(Continued)

*Primary Examiner* — Mark G. Pannell
(74) *Attorney, Agent, or Firm* — Murphy, Bilak & Homiller, PLLC

(57) ABSTRACT

A radio network node (12) in a radio access network (RAN1) and a method therein for Paging Policy Differentiation (PPD). The radio network node receives from a core network (CN1) a Downlink (DL) Protocol Data Unit (PDU) associated with a wireless device (10). The DL PDU is comprised in a Quality of Service (QoS)-flow, is originated from a respective service and comprises a Paging Policy Indicator (PPI) associated with the respective service. The radio network node extracts the PPI by means of a Central Unit User Plane (CU-UP) (12b). By means of the CU-UP (12b), the radio network node informs a Central Unit Control Plane (CU-CP) (12a) about the PPI. Further, by means of the CU-CP, the radio network node triggers paging of the (Continued)

wireless device. Furthermore, the radio network node pages the wireless device (10) according to the PPI associated with the respective service.

10 Claims, 11 Drawing Sheets

(51) Int. Cl.
*H04W 68/02* (2009.01)
*H04W 28/02* (2009.01)
*H04W 80/02* (2009.01)

(58) Field of Classification Search
USPC .......................................................... 455/458
See application file for complete search history.

(56) References Cited

FOREIGN PATENT DOCUMENTS

| WO | 2011162667 | A1 | 12/2011 |
|----|------------|----|---------|
| WO | 2015094057 | A1 | 6/2015 |
| WO | 2017135857 | A1 | 8/2017 |
| WO | 2019154011 | A1 | 8/2019 |

OTHER PUBLICATIONS

3GPP, "3rd Generation Partnership Project; Technical Specification Group Radio Access Network; NG-RAN; NG Application Protocol (NGAP) (Release 15)", 3GPP TS 38.413 V0.9.0, May 2018, pp. 1-283.

3GPP, "3rd Generation Partnership Project; Technical Specification Group Radio Access Network; NG-RAN; NR user plane protocol (Release 15)", 3GPP TS 38.425 V15.1.0, Mar. 2018, pp. 1-19.

3GPP, "3rd Generation Partnership Project; Technical Specification Group Radio Access Network; NG-RAN; PDU Session User Plane Protocol (Release 15)", 3GPP TS 38.415 V0.2.0, May 2018, pp. 1-12.

3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, pp. 1-22.

3GPP, "3rd Generation Partnership Project; Technical Specification Group Services and System Aspects; IP Multimedia Subsystem (IMS); Stage 2 (Release 15)", 3GPP TS 23.228 V15.2.0, Mar. 2018, pp. 1-330.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Unknown, Author, "Presentation of Specification/Report to TSG: TS38.463, Version 1.0.0", 3GPP TSG-RAN Meeting #80, Tdoc RP-181154, La Jolla, CA, USA, Jun. 11-14, 2018, pp. 1-1.

Unknown, Author, "TS 38.413 v0.9.0 covering agreements of RAN3#100", 3GPP TSG-RAN WG3 Meeting #100, R3-183592, Busan, Korea, May 21-25, 2018, pp. 1-2.

3GPP, "3rd Generation Partnership Project; Technical Specification Group Radio Access Network; NG-RAN Architecture description (Release 15)", 3GPP TS 38.401 V15.0.0, Dec. 2017, pp. 1-23.

3GPP, "3rd Generation Partnership Project; Technical Specification Group Services and System Aspects; System Architecture for the 5G System; Stage 2 (Release 15)", 3GPP TS 23.501 V15.2.0, Jun. 2018, pp. 1-217.

Unknown, Author, "[TP for BL CR for TS 38.463] Paging Priority Indication over E1", 3GPP TSG-RAN WG3 #101bis, Tdoc R3-185924, Chengdu, P.R. China, Oct. 8-12, pp. 1-69.

Unknown, Author, "Further Correction of TS 38.415", 3GPP TSG-RAN WG3#101, R3-185127, Gothenburg, Sweden, Aug. 20-24, 2018, pp. 1-6.

Unknown, Author, "Paging policy differentiation for RRC inactive", 3GPP TSG-SA2 Meeting #128, S2-187603, Vilnius, Lithuania, Jul. 2-6, 2018, pp. 1-2.

3GPP, "3rd Generation Partnership Project; Technical Specification Group Radio Access Network; NG-RAN; Architechture description (Release 15)", 3GPP TS 38.401 V15.2.0, Jun. 2018, 1-39 pages.

Unknown, Author, "TS 38.415 v0.2.0 covering agreements of RAN3#100", 3GPP TSG-RAN WG3#100 R3-183594, Busan, Korea, May 21-25, 2018, 1 page.

Unknown, Author, "(TP for CPUP_Split BL CR for TS 38.401): Issues on RRC-Inactive state in CU-DU split", 3GPP TSG-RAN WG3 Meeting #100, R3-183064, Busan, Korea, May 21-25, 2018, 1-8.

Unknown, Author, "Assistance Information for RAN Paging Priority", 3GPP TSG-RAN WG3#99bis, R3-182434, Sanya, China, Apr. 16-20, 2018, 1-6.

Unknown, Author, "E1 control of UP resources in NG-RAN", 3GPP TSG-RAN WG3 Meeting #99, R3-181290, Athens, Greece, Feb. 26-Mar. 2, 2018, 1-5.

Unknown, Author, "pCR to 38.460 on Inactivity monitoring in CP/UP separation", 3GPP TSG-RAN3 Meeting #100, R3-183282, Busan, Korea, May 21-25, 2018, 1-6.

Unknown, Author, "UE context management function over E1 interface", 3GPP TSG-RAN WG3 NR#99, R3-181134, Athens, Greece, Feb. 26-Mar. 2, 2018, 1-5.

* cited by examiner

| | | Bits | | | | | | Number of Octets |
|---|---|---|---|---|---|---|---|---|
| 7 | 6 | 5 | 4 | 3 | 2 | 1 | 0 | |
| PDU Type (=0) | | | | Spare | | | | 1 |
| Spare (PPI) | RQI | QoS Flow Identifier | | | | | | 1 |
| Padding | | | | | | | | 0-3 |

Fig. 7

| IE/Group Name | Presence | Range | IE type and reference | Semantics descr. | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| PPI | O | | INTEGER (1..8, ...) | Paging Policy Indicator used in PPD | YES | ignore |

Fig. 8

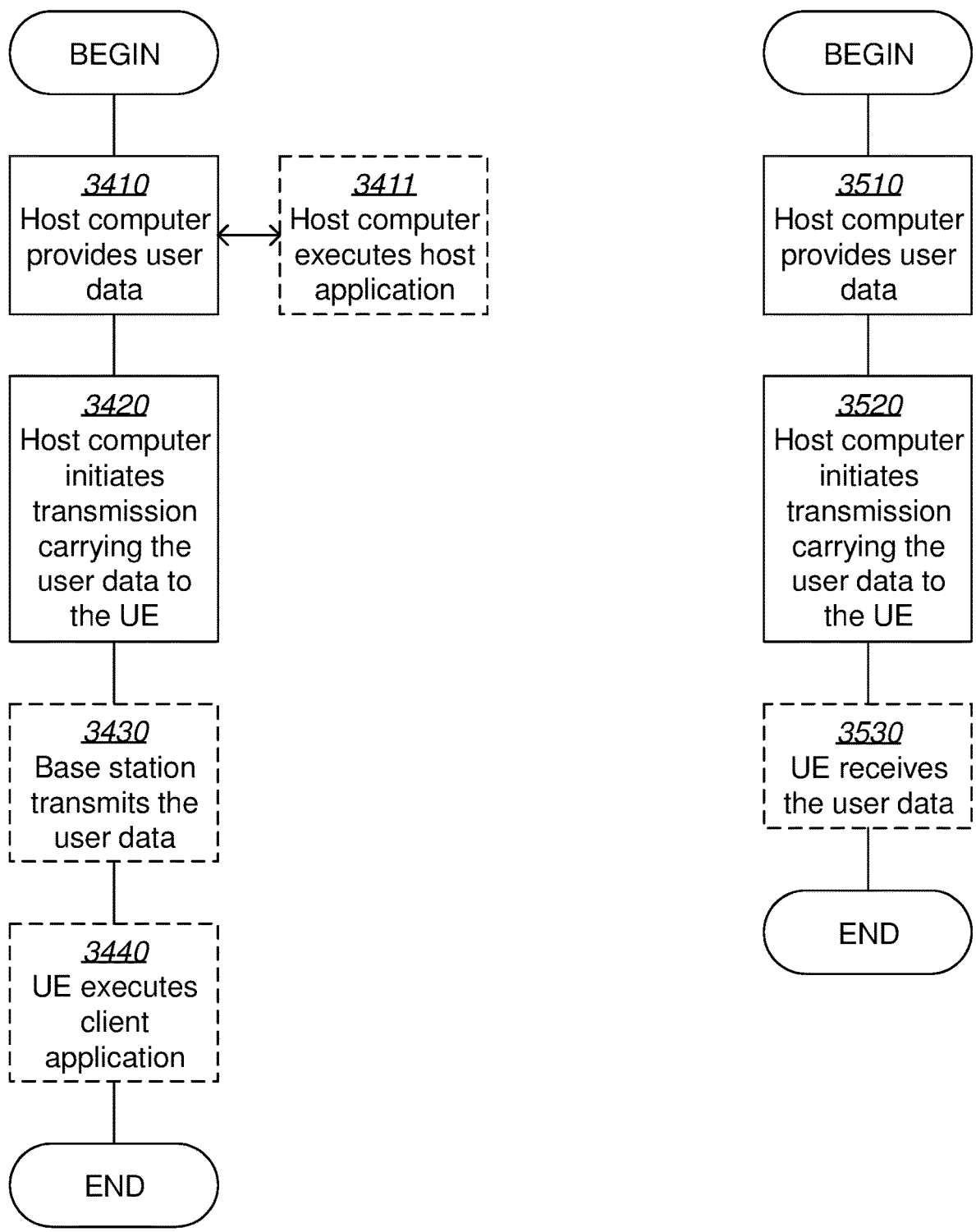

RADIO NETWORK NODE, USER PLANE FUNCTION (UPF) AND METHODS PERFORMED THEREIN FOR PAGING POLICY DIFFERENTIATION

TECHNICAL FIELD

Embodiments herein relate to a radio network node, a User Plane Function (UPF) and methods performed therein. Furthermore, a computer program product and a computer readable storage medium are also provided herein. In particular, embodiments herein relate to Paging Policy Differentiation (PDD).

BACKGROUND

In a typical wireless communication network, wireless devices, also known as wireless communication devices, mobile stations, stations (STAs) and/or user equipments (UEs), communicate via a Radio Access Network (RAN) to one or more core networks (CNs). The RAN covers a geographical area which is divided into service areas or cells, with each service area or cell being served by a radio network node such as a radio access node e.g., a Wi-Fi access point or a Radio Base Station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the wireless device within range of the radio network node.

A Universal Mobile Telecommunications System (UMTS) is a Third Generation (3G) telecommunication network, which evolved from the Second Generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for wireless devices. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New generation Radio (NR) is a new radio access technology being standardized in 3GPP.

New Generation Radio Access Network (NG-RAN) Architecture

The NG-RAN may also be referred to as a 5 Generation Radio Access Network (5G RAN). The current 5G RAN, i.e., NG-RAN architecture is described in 3GPP TS 38.401.

The NG architecture can be further described as follows:
  The NG-RAN comprises a set of gNBs connected to a New Generation Core Network (NGC), which may also be referred to as 5 Generation Core Network (5GC) through a New Generation (NG) interface.
  A gNB can support Frequency-Division Duplex (FDD) mode operation, Time-Division Duplex (TDD) mode operation or dual mode operation.
  gNBs can be interconnected through an Xn interface, which may comprise an Xn Control plane (Xn-C) interface and an Xn User plane (Xn-U) interface.
  A gNB may comprise a gNB Central Unit (CU) (gNB-CU) and gNB Decentralized Units (DUs) (gNB-DUs).
  A gNB-CU and a gNB-DU are connected via an F1 logical interface.
  One gNB-DU is connected to only one gNB-CU.
  The NG, Xn and F1 are logical interfaces. For the NG-RAN, the NG and Xn-C interfaces for a gNB comprising a gNB-CU and gNB-DUs, terminate in the gNB-CU. For E-UTRA-NR Dual Connectivity (EN-DC), a S1 User plane (S1-U) and an X2 Control plan (X2-C) interfaces for a gNB terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface, e.g. for each one of the NG, Xn, F1 interfaces, the related TNL protocol and the functionality are specified. The TNL provides services for user plane transport and signalling transport. In the NG-Flex configuration, each gNB is connected to all Access and Mobility Functions (AMFs) within an AMF Region. The AMF Region is defined in 3GPP TS 23.501.

The general principles for the specification of the F1 interface are as follows:
  the F1 interface is to be open;
  the F1 interface supports the exchange of signalling information between the endpoints, and in addition the F1 interface may support data transmission to the respective endpoints;
  from a logical standpoint, the F1 interface is a point-to-point interface between the endpoints. A point-to-point logical interface should be feasible even in the absence of a physical direct connection between the endpoints;
  the F1 interface supports control plane and user plane separation, via the F1-C and F1-U interfaces, respectively;
  the F1 interface separates the Radio Network Layer and the Transport Network Layer;
  the F1 interface enables exchanges of UE associated information and non-UE associated information;

the F1 interface is defined to be future proof to fulfil different new requirements, support new services and new functions;

one gNB-CU and a set of gNB-DUs are visible to other logical nodes, such as a gNB. The gNB terminates the X2, the Xn, the NG and the S1-U interfaces; the CU may be separated in Control Plane (CP) and User Plane (UP).

The 3GPP RAN Working Group 3 (WG3) has started working on a split architecture of a gNB, which split architecture comprises a new open interface between the Control Plane (CU-CP) and the User Planes (CU-UP) of the CU. The related agreements are collected in the 3GPP TR 38.806 document. The open interface between the CU-CP and the CU-UP is named E1, i.e. the E1 interface. The split architecture is shown in FIG. 2.

Three deployment scenarios for the split architecture of the gNB are shown in the 3GPP TR 38.806 document:
Scenario 1: the CU-CP and the CU-UP are centralized;
Scenario 2: the CU-CP is distributed and the CU-UP is centralized;
Scenario 3: the CU-CP is centralized and the CU-UP is distributed.

An E1 Application Protocol (E1AP) is defined in the 3GPP TS 38.463 document. The E1AP defines the messages that are exchanged between the CU-CP and the CU-UP for the sake of providing user-plane services to the UE over the E1 interface.

Paging Policy Differentiation in NG-RAN

Paging in a network, i.e. in a communications network, is used to inform and/or notify a UE about various events. In other words, paging is a mechanism in which the network tells the UE: "I have something for you". Then the UE decodes a content, e.g. the paging cause, of a paging message and the UE may initiate a corresponding procedure.

In most cases, a paging procedure happens while the UE is in an idle mode. This means that the UE may monitor whether the network is sending any paging message to it and it may spend some energy, e.g. battery, to run this "Monitoring" process.

Paging Policy Differentiation (PPD) is an optional feature that allows the AMF, based on operator configuration, to apply different paging strategies for different traffic or service types provided within the same Protocol Data Unit (PDU) Session. In the 3GPP standard Rel-15 this feature applies only to the PDU session of Internet Protocol (IP) type.

When the 5G System (5GS) supports the Paging Policy Differentiation (PPD) feature, a Differentiated Services Code Point (DSCP) value is set by an application to indicate to the 5GS which Paging Policy should be applied for a certain IP packet. The DSCP value may be carried in a Type Of Service (ToS) field in a IP version 4 (IPv4) header or in a Traffic Class (TC) field in a IP version 6 (IPv6) header. For example, as defined in the 3GPP TS 23.228 document, a Proxy Call Session Control Function (P-CSCF) may support PPD by marking packet(s) to be sent towards the UE that relate to a specific IP Multimedia Subsystem (IMS) service. The specific IMS service may for example be conversational voice as defined in the IMS multimedia telephony service.

It may be possible for the operator to configure the System Management Facility (SMF) in such a way that the PPD feature only applies to certain Home Public Land Mobile Networks (HPLMNs), Digital News Networks (DNNs) and 5G Quality of Service (QoS) Indicators (5QIs). In the case of Home Routed (HR) roaming, this configuration is done in the SMF in the Visited PLMN (VPLMN). Support of PPD in the case of HR roaming requires inter operator agreements including on the DSCP value associated with this feature.

In the case of Network Triggered Service Request and User Plane Function (UPF) buffering downlink (DL) data packet, the UPF may include the DSCP in the Type of Service (TOS) (IPv4) value or in the Transmission Control (TC) (IPv6) value from the IP header of the downlink data packet and an indication of the corresponding QoS Flow in the data notification message sent to the SMF. When the PPD applies, the SMF determines a Paging Policy Indicator (PPI) based on the DSCP received from the UPF.

In the case of Network Triggered Service Request and SMF buffering downlink data packet, when the PPD applies, the SMF determines the PPI based on the DSCP in the TOS (IPv4) value and/or TC (IPv6) value from the IP header of the received downlink data packet and identifies the corresponding QoS Flow from a QoS Flow ID (QFI) of the received downlink data packet.

The SMF includes the PPI, a Retention Priority, e.g. an Allocation and Retention Priority, (ARP) and the 5QI of the corresponding QoS Flow in a N11 message sent to the AMF. If the UE is in Connection Management (CM) IDLE, the AMF uses this information to derive a paging strategy and sends paging messages to the NG-RAN over a N2 interface. The network configuration needs to ensure that the information used as a trigger for Paging Policy Indication is not changed within the 5GS. Further, the network configuration needs to ensure that the specific DSCP in the TOS (IPv4) value and/or in the TC (IPv6) value, used as a trigger for Paging Policy Indication, is managed correctly in order to avoid the accidental use of certain paging policies.

The SMF may configure the UPF in such a way that traffic with the same QoS but different paging differentiation requirements is transferred in different QoS Flows. In addition, the SMF may indicate over the N2 interface to the NG-RAN the Paging Policy Indicator (PPI) for a QoS Flow (QFI) so that for a UE in Radio Resource Control (RRC) Inactive state the NG-RAN may enforce specific paging policies in the case of NG-RAN paging, based on the 5QI, the ARP and this PPI associated with the QFI of an incoming DL PDU.

The current solution for applying Paging Policy Differentiation for RAN Paging is the following:
The AMF sends to the CU-CP a paging policy for each QoS-Flow over the NG-C interface:
The AMF can use either the PDU Session Resource Setup Request message or the PDU Session Resource Modify message to provide the paging policy (PPI: Paging Policy Indicator) for each QoS-Flow in a PDU Session to the CU-CP. For more information see 3GPP TS 38.413, NG Application Protocol (NGAP).
NOTE: the AMF sends the paging policies (e.g. the PPIs) to the CU-CP when the UE is connected state (RRC_CONNECTED).
The CU-CP stores the PPI for each QoS-Flow.
The CU-CP decides to send the UE to inactive state (RRC_INACTIVE).
NOTE: This requires a state transition from RRC_CONNECTED to RRC_INACTIVE. How and when the CU-CP decides to perform the state transition is not relevant for this disclosure.
The CU-CP informs the CU-UP when the UE enters inactive state over the E1 interface using the Bearer Context Modification procedure.
The CU-UP may receive traffic in DL from the 5GC over the NG-U interface for an inactive UE.

The CU-UP informs the CU-CP about the incoming DL traffic over the E1 interface using the DL Data Notification procedure.

The CU-CP triggers RAN Paging.

The CU-CP applies the paging policy (e.g. the PPI) for the QoS-Flow for which DL traffic has been detected over the NG-U interface.

SUMMARY

An object of embodiments herein is to provide a mechanism for improving performance of the wireless communication network in an efficient manner.

According to an aspect the object is achieved by providing a method performed by a radio network node for Paging Policy Differentiation (PPD). The radio network node receives from a core network, a Downlink (DL) Protocol Data Unit (PDU) associated with a wireless device. The DL PDU is comprised in a Quality of Service (QoS)-flow. The DL PDU is originated from a respective service. The DL PDU comprises a Paging Policy Indicator (PPI) associated with the respective service. The radio network node extracts the PPI by means of a Central Unit User Plane (CU-UP) of the radio network node. By means of the CU-UP, the radio network node informs a Central Unit Control Plane (CU-CP) of the radio network node about the PPI. By means of the CU-UP, the radio network node triggers paging of the wireless device. Further, the radio network node performs paging of the wireless device according to the PPI associated with the respective service. Thereby, the PPD is provided.

According to another aspect the object is achieved by providing a method performed by a User Plane Function (UPF) for Paging Policy Differentiation (PPD). The UPF sends a downlink (DL) Protocol Data Unit (PDU) associated with a wireless device to a radio network node which is in a radio access network. The DL PDU is comprised in a Quality of Service (QoS)-flow. The DL PDU is originated from a respective service. The DL PDU comprises a Paging Policy Indicator (PPI) associated with the respective service.

According to still another aspect the object is achieved by providing a radio network node for Paging Policy Differentiation (PPD). The radio network node is configured to receive from a core network, a Downlink (DL) Protocol Data Unit (PDU) associated with a wireless device. The DL PDU is comprised in a Quality of Service (QoS)-flow. The DL PDU is originated from a respective service. The DL PDU comprises a Paging Policy Indicator (PPI) associated with the respective service. The radio network node is further configured to extract the PPI by means of a Central Unit User Plane (CU-UP) of the radio network node. By means of the CU-UP, the radio network node is configured to inform a Central Unit Control Plane (CU-CP) of the radio network node about the PPI. By means of the CU-UP, the radio network node is configured to trigger paging of the wireless device. Further, the radio network node is configured to perform paging the wireless device according to the PPI associated with the respective service. Thereby, the PPD is provided.

According to yet another aspect the object is achieved by providing a User Plane Function (UPF) for Paging Policy Differentiation (PPD). The UPF is configured to send a downlink (DL) Protocol Data Unit (PDU) associated with a wireless device to a radio network node which is in a radio access network. The DL PDU is comprised in a Quality of Service (QoS)-flow. The DL PDU is originated from a respective service. The DL PDU comprises a Paging Policy Indicator (PPI) associated with the respective service.

It is furthermore provided herein a computer program product comprising instructions, which, when executed on at least one processor, cause the at least one processor to carry out any of the methods above, as performed by the radio network node or the UPF. It is additionally provided herein a computer-readable storage medium, having stored thereon a computer program product comprising instructions which, when executed on at least one processor, cause the at least one processor to carry out the method according to any of the methods above, as performed by the radio network node or the UPF.

According to still another aspect the object is achieved by providing a radio network node comprising processing circuitry configured to receive from a core network, a Downlink (DL) Protocol Data Unit (PDU) associated with a wireless device. The DL PDU is comprised in a Quality of Service (QoS)-flow. The DL PDU is originated from a respective service. The DL PDU comprises a Paging Policy Indicator (PPI) associated with the respective service. The processing circuitry is further configured to extract the PPI, to inform a Central Unit Control Plane (CU-CP) of the radio network node about the PPI, and to trigger paging of the wireless device. Further, the radio network node is configured to perform paging of the wireless device according to the PPI associated with the respective service.

According to still another aspect the object is achieved by providing a User Plane Function (UPF) comprising processing circuitry configured to send a downlink (DL) Protocol Data Unit (PDU) associated with a wireless device to a radio network node which is in a radio access network. The DL PDU is comprised in a Quality of Service (QoS)-flow. The DL PDU is originated from a respective service. The DL PDU comprises a Paging Policy Indicator (PPI) associated with the respective service.

Embodiments herein provide an enhanced PPD, where paging policies are further differentiated for different services within the same QoS-flow. Thanks to the PPI per service within the same QoS-flow, the DL PDUs of the different services in the same QoS-Flow are dealt with differently. Due to the PPI per service within the same QoS-flow is carried in the DL PDU, the paging of the wireless device is directly performed based on DL PDU by the radio network node.

BRIEF DESCRIPTION OF THE DRAWINGS

Embodiments will now be described in more detail in relation to the enclosed drawings, in which:

FIG. 7 is a diagram depicting a DL PDU Session Information frame according to embodiments herein;

FIG. 8 is a diagram depicting a DL Data Notification message according to embodiments herein;

FIG. 11-FIG. 16 are flowcharts illustrating methods implemented in a communication system including a host computer, a base station and a user equipment.

DETAILED DESCRIPTION

Figure 3A:
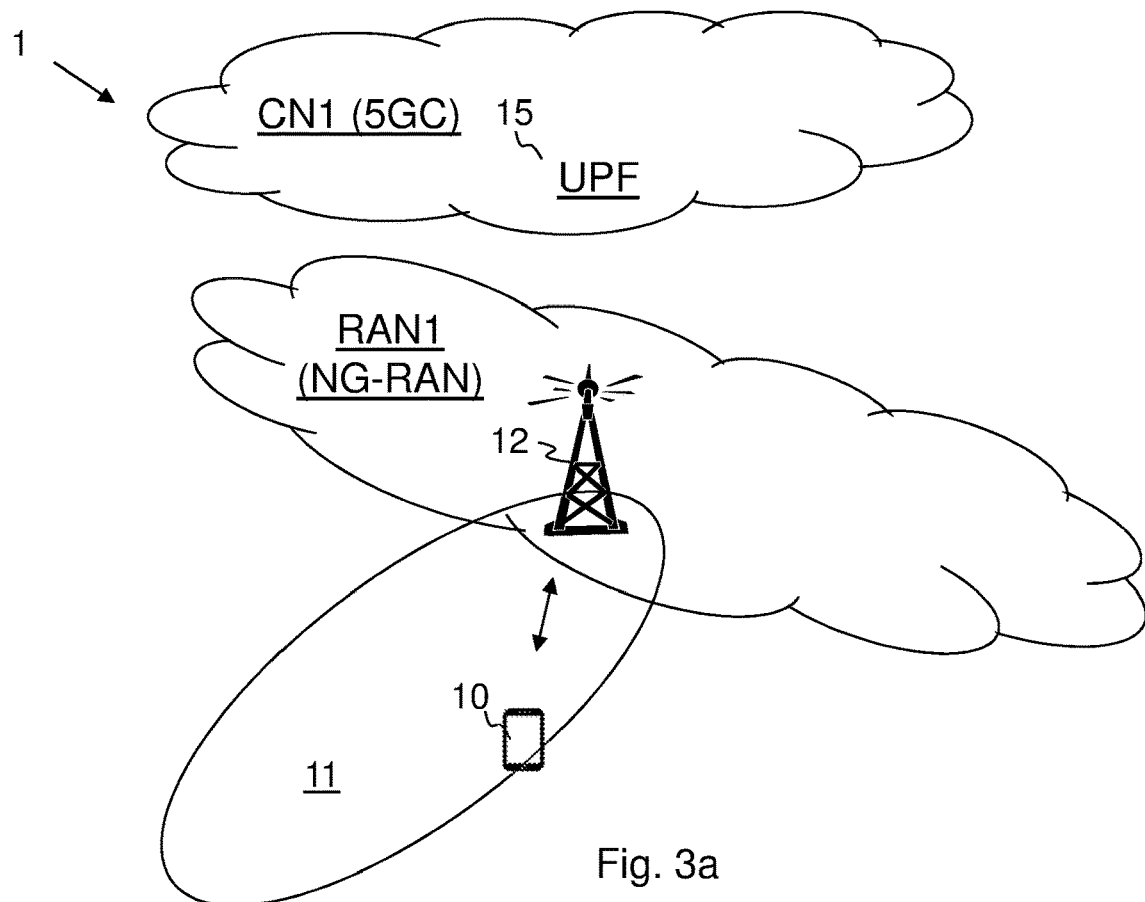
FIG. 3a is a schematic overview depicting a wireless communication network according to embodiments herein.

Embodiments herein relate to wireless communication networks in general. FIG. 3*a* is a schematic overview depicting a wireless communication network 1. The wireless communication network 1 comprises one or more RANs e.g. a first RAN RAM, connected to one or more CNs CN1, e.g., 5GCs. The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a wireless device such as a mobile station, a non-access point (non-AP) station (STA), a STA, a user equipment and/or a wireless terminal, are connected via the one or more RANs RAM, to the one or more CNs CN1, e.g., 5GCs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area. The wireless device 10 searches for carriers using a carrier raster. The carrier raster indicating possible frequency positions of a carrier for the wireless device.

The wireless communication network 1 comprises a radio network node 12. The radio network node 12 is exemplified herein as a RAN node providing radio coverage over a geographical area, a first service area 11, of a Radio Access Technology (RAT), such as NR, LTE, UMTS, Wi-Fi or similar. The radio network node 12 may be a radio access network node such as radio network controller or an access point such as a Wireless Local Area Network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a wireless device 10 within the service area served by the radio network node 12 depending e.g. on the radio access technology and terminology used and may be denoted as a receiving radio network node. The radio network node 12 may alternatively be a core network node such as an MME or controlling network node.

It should be noted that a service area may be denoted as cell, beam, beam group or similar to define an area of radio coverage.

Embodiments herein are related to Paging Policy Differentiation (PPD), e.g., for Inactive UEs in a NG-RAN.

In the conventional solution, different services, i.e., different service data flows, may be mapped on the same QoS-Flow. However each service may require a different paging policy. For example: Instant Message (IM) over IMS and voice over IMS may be mapped on the same QoS-Flow, but these two services may require different paging policies.

The conventional solution only allows different paging policies for different QoS-Flows, and does not allow applying different paging policies for services that are mapped on the same QoS-Flow.

The embodiments herein provide different paging policies for different services that are mapped on the same QoS-Flow. The paging policy is indicated by a Paging Policy Indicator (PPI).

The terms paging policy indicator and paging priority indicator are interchangeable in this disclosure.

Figure 1:
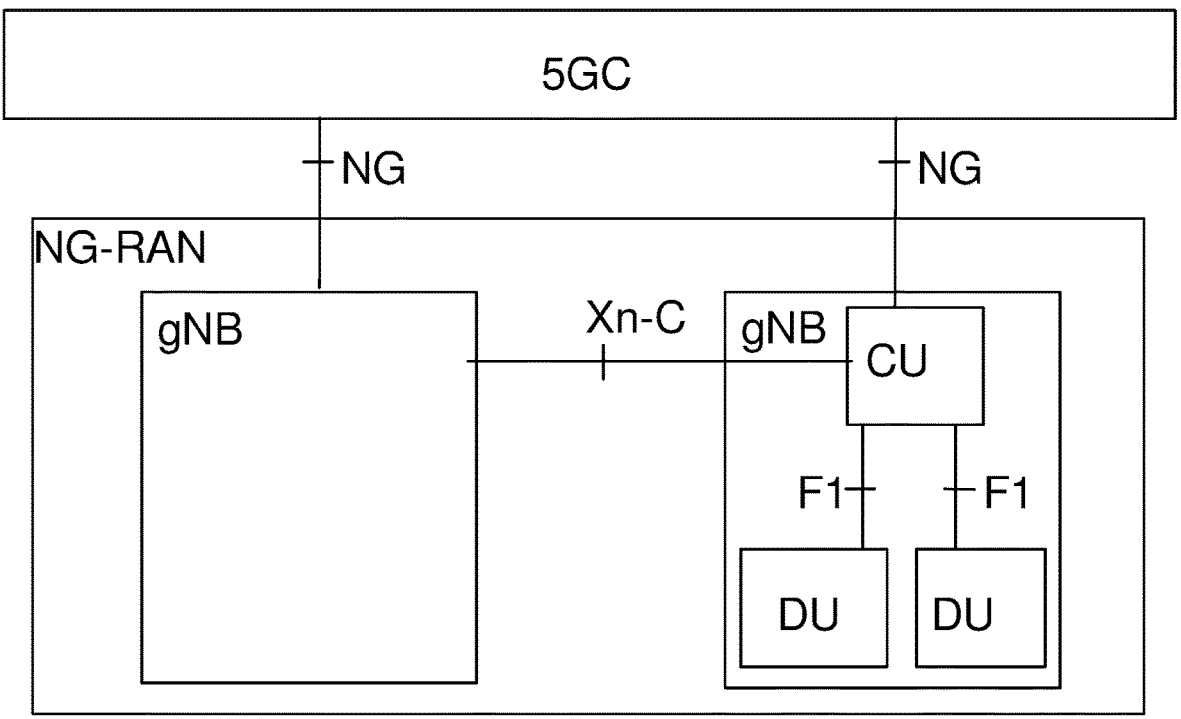
FIG. 1 is a schematic overview depicting a new generation wireless communication network architecture according to embodiments herein.
Figure 2:
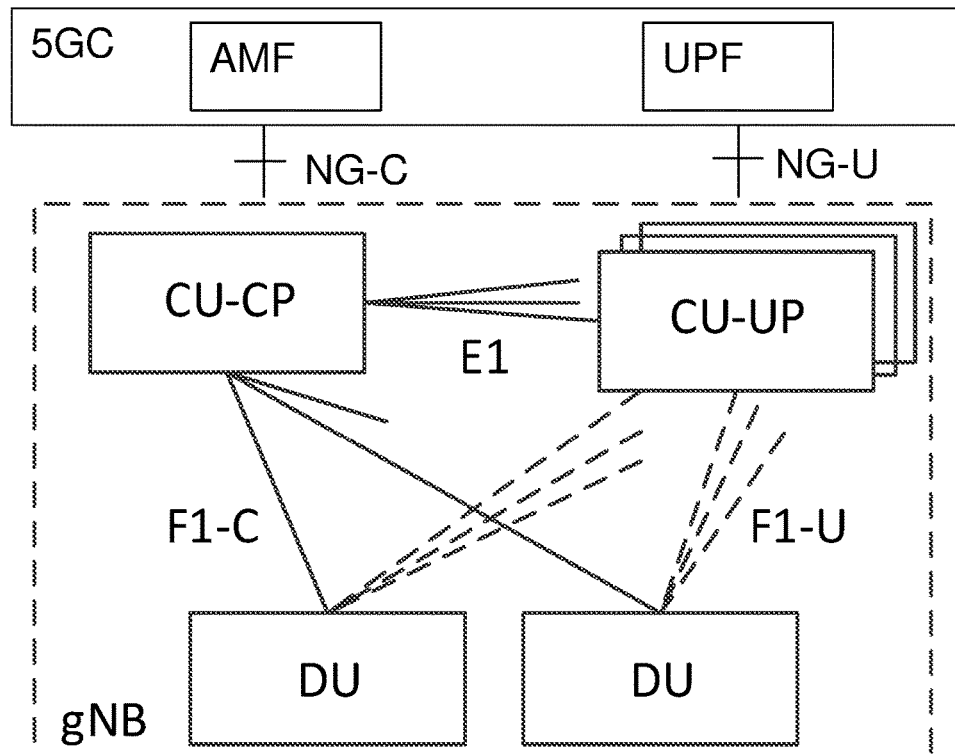
FIG. 2 is a schematic overview depicting a split gNB architecture according to embodiments herein.
Figure 3B:
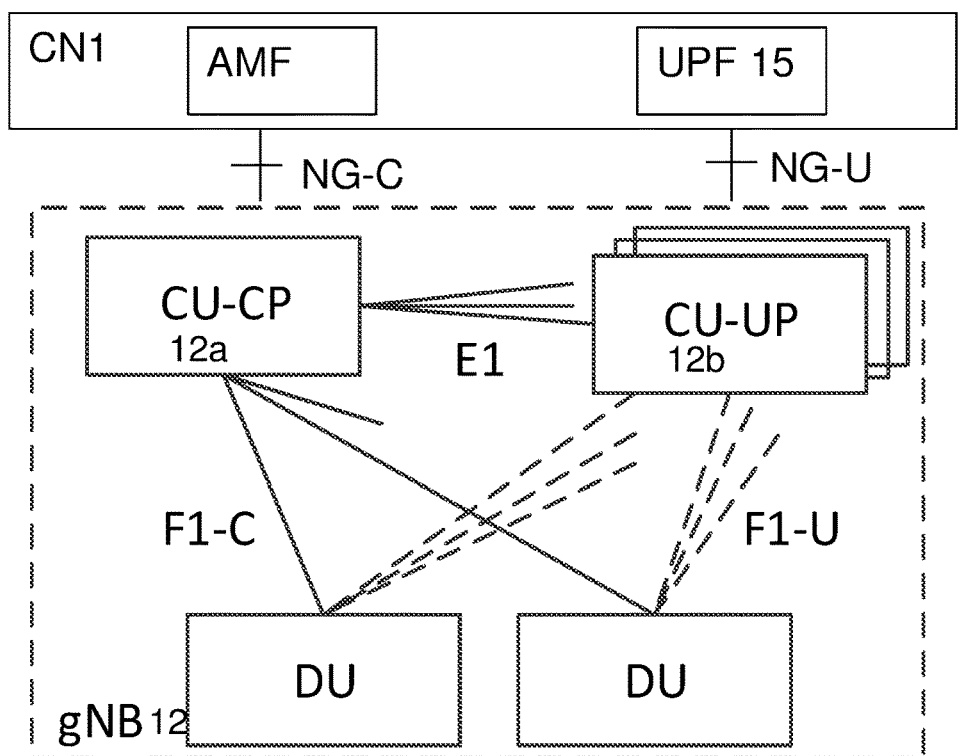
FIG. 3b is a schematic overview depicting a split architecture of a radio network node according to embodiments herein.

FIG. 3*b* schematically illustrates a split architecture of the radio network node 12 according to embodiments described herein. The split architecture relates to the split architecture schematically illustrated in FIG. 2. As schematically illustrated, the split architecture comprises a new open interface between the Central Unit Control Plane (CU-CP) 12*a* and the Control Unit User Planes (CU-UP) 12*b*. The open interface between the CU-CP 12*a* and the one or more CU-UPs 12*b* is named the E1 interface. As previously mentioned, the E1AP defines the messages that are exchanged between the CU-CP 12*a* and the CU-UP 12*b* for the sake of providing user-plane services to the UE 10 over the E1 interface.

Further, the core network CN1 of FIG. 3*b* comprises an AMF and an UPF 15 which may communicate with the radio network node 12 over the NG-C interface and the NG-U interface, respectively.

Figure 4A:
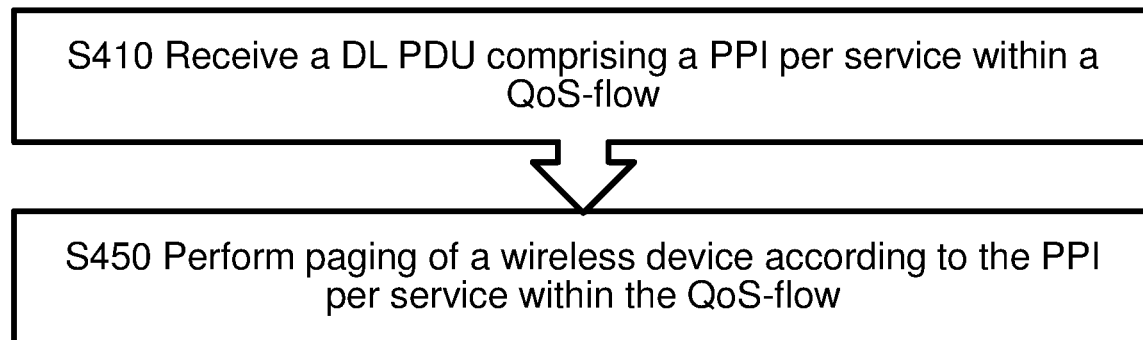
FIG. 4a-FIG. 4b are flowcharts depicting methods performed by a radio network node according to embodiments herein.
Figure 6:
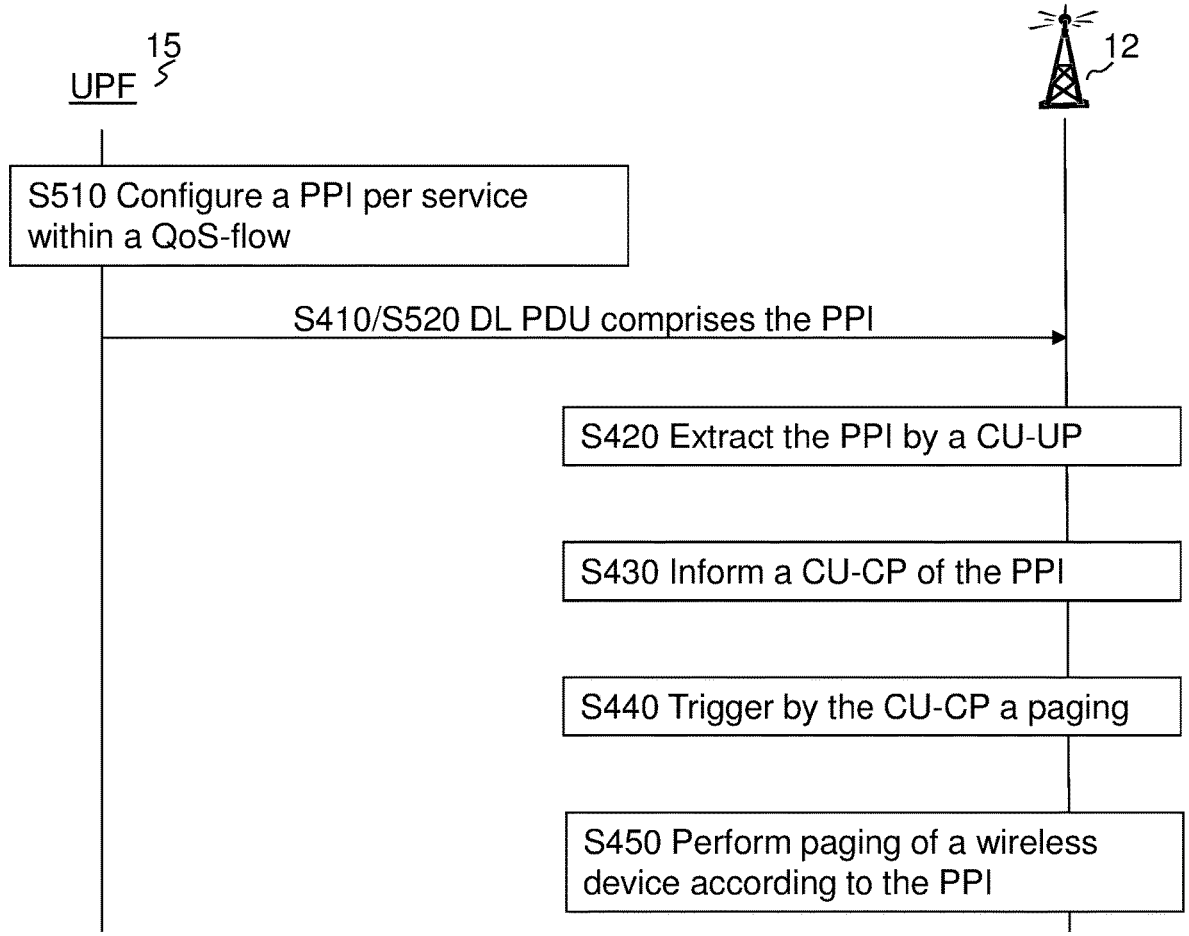
FIG. 6 is a combined signalling scheme and flowchart according to embodiments herein.

The method actions performed by a radio network node 12 in a Radio Access Network (RAN), e.g. the RAN1, for Paging Policy Differentiation (PPD) according to embodiments herein will now be described with reference to a flowchart depicted in FIG. 4*a*, together with FIG. 6 which is a schematic combined signaling scheme and flowchart depicting embodiments herein. Thus, the radio network node 12 performs action for PPD. As previously mentioned, the radio network node 12 is comprised in the RAN1. The actions do not have to be taken in the order stated below, but may be taken in any suitable order. Actions performed in some embodiments may be marked with dashed boxes.

Action S410. In embodiments herein, the radio network node 12 may receive a downlink (DL) Protocol Data Unit (PDU) from a core network, e.g. the core network CN1 in FIGS. 3*a* and 3*b*. The DL PDU is associated with a wireless device 10, e.g., for informing and/or notifying the wireless device 10 about an event. The DL PDU may be comprised in a Quality of Service (QoS)-flow. The DL PDU may be originated from a respective service. The DL PDU may comprise a Paging Policy Indicator (PPI) associated with the respective service. That is to say, the DL PDU may comprise a Paging Policy Indicator (PPI) per service within the QoS-flow. Thus, embodiments herein provide different paging policies for different services' DL PDUs that are mapped on the same QoS-Flow.

One QoS-flow may comprise plurality of DL PDUs. The DL PDUs may be associated with different services. However all DL PDUs in one QoS-flow may have a same QoS requirement. In other words, PDUs, though being originated from different services, may be mapped to the same QoS-Flow as long as the PDUs have the same QoS requirement.

The term QoS-Flow herein may refer to a flow of PDUs with a specific QoS requirement. This flow may comprise PDUs associated with different services, e.g., IM, voice, video etc.

The DL PDU may be any frame transmitted from the core network CN1 to the radio network node 12. The PPI may be carried in any field of the DL PDU. According to an unlimited example shown in FIG. 7, the DL PDU may be a DL PDU session information frame, and the PPI may be carried in a spare field of the DL PDU session information frame.

The DL PDU itself may not be sent to the wireless device 10. However this DL PDU may contain data for the wireless device 10, if so, the data may be sent to the wireless device 10 after the paging procedure is done.

Action S450. Based on the DL PDU associated with the wireless device 10, the radio network node 12 may perform paging of the wireless device 10 according to the PPI associated with the respective service, i.e., the PPI per service within the QoS-flow.

Embodiments herein provide an enhanced PPD, where paging policies are further differentiated for different services within the same QoS-flow. Thanks to different services configured with different PPIs, the DL PDUs of the different services in the same QoS-Flow are accordingly dealt with differently. Due to the PPI per service within the same QoS-flow is carried in the DL PDU, the paging of the wireless device 10 may be directly performed based on the DL PDU by the radio network node 12.

According to some embodiments, the radio network node 12 may have the above split architecture as shown in FIGS. 2 and 3b. In such a case, the radio network node 12 may comprise the CU and the DUs. The CU may comprise the Control Plane (CU-CP) 12a and the User Plane (CU-UP) 12b. The CU-CP 12a and one DU may communicate via the F1-C interface. The CU-UP 12b and one DU may communicate via the F1-U interface. The E1 interface may be employed between the CU-CP 12a and the CU-UP 12b of the CU. More related agreements on the split architecture may also be collected in the 3GPP TR 38.806 document.

Figure 4B:
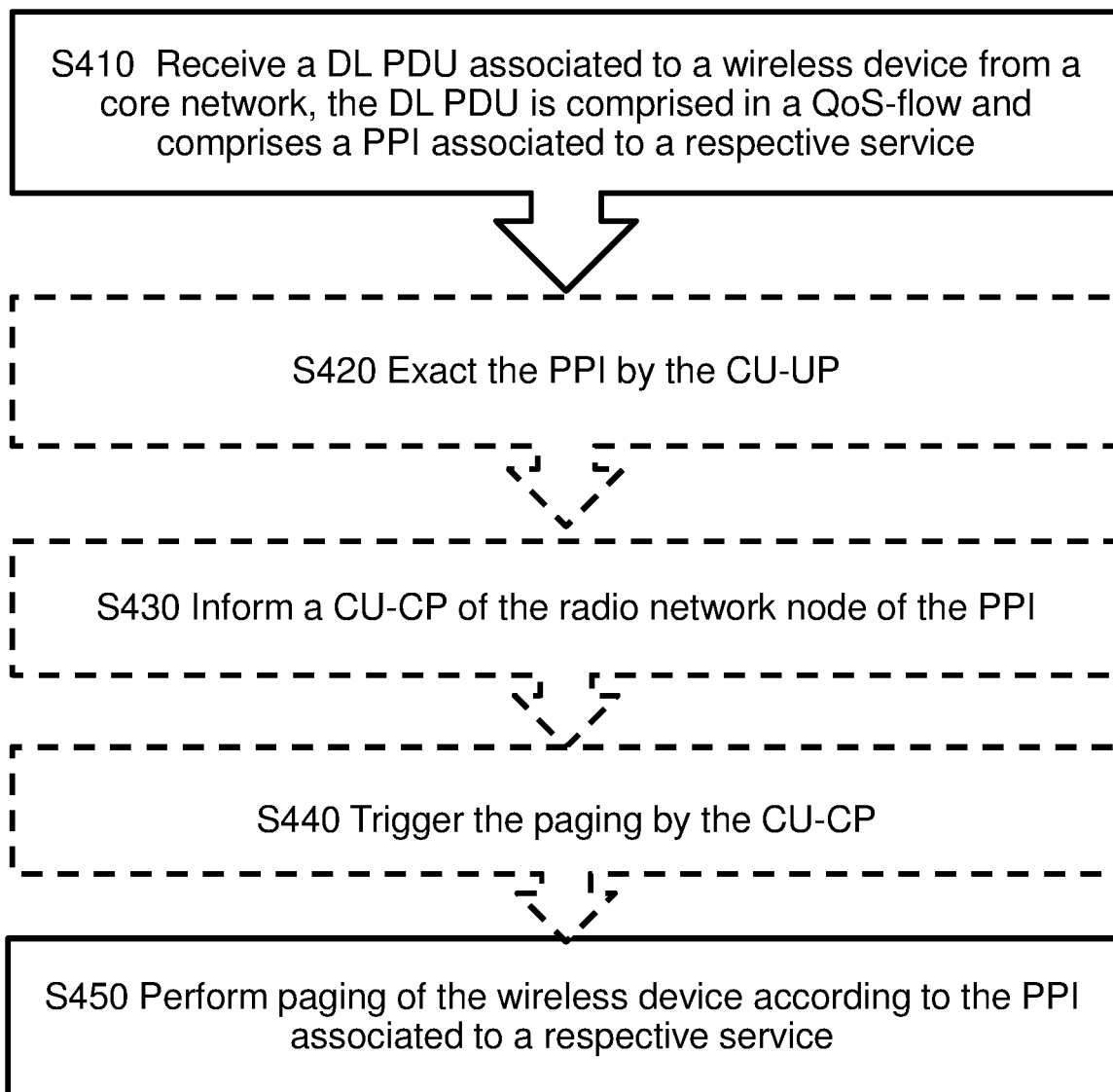

When the radio network node 12 has the above split architecture, the method actions performed by the radio network node 12 in the radio access network RAN1 for Paging Policy Differentiation (PPD) will be further explained herein. Embodiments herein will now be described with reference to a flowchart depicted in FIG. 4b, together with FIG. 6 which is a schematic combined signaling scheme and flowchart. The actions do not have to be taken in the order stated below, but may be taken in any suitable order. Actions performed in some embodiments may be marked with dashed boxes.

Action S410. It may be the Central Unit User Plane (CU-UP) 12b of the radio network node 12 that receives the DL PDU with the PPI associated with the respective service, i.e., the PPI per service, e.g., from the User Plane Function (UPF) 15 in the core network CN1, e.g., via the New Generation User plane (NG-U) interface.

Action S420. After receiving the DL PDU, the CU-UP 12b of the radio network node 12 may extract, i.e., determine, the PPI carried therein.

Action S430. Next, the CU-UP 12b of the radio network node 12 may inform the CU-CP 12a of the radio network node 12 of the PPI.

The PPI may be informed by using any message, e.g., a DL data notification message as shown in FIG. 8, transmitted from the CU-UP 12b to the CU-CP 12a via, e.g. the E1 interface.

Action S440. Based on the PPI per service, the CU-CP 12a of the radio network node 12 may trigger the paging of the wireless device 10.

Action S450. The CU-CP 12a of radio network node 12 may perform the paging of the wireless device 10 according to the PPI per service within the QoS-flow, e.g., carried in the DL data notification message.

By employing the mechanisms described herein, the provided enhanced PPD are applicable to any radio network node 12 having a split architecture.

Some embodiments are described in the context of NR, however the skilled person will appreciate that the embodiments herein are also applied to other wireless communication system.

Figure 5:
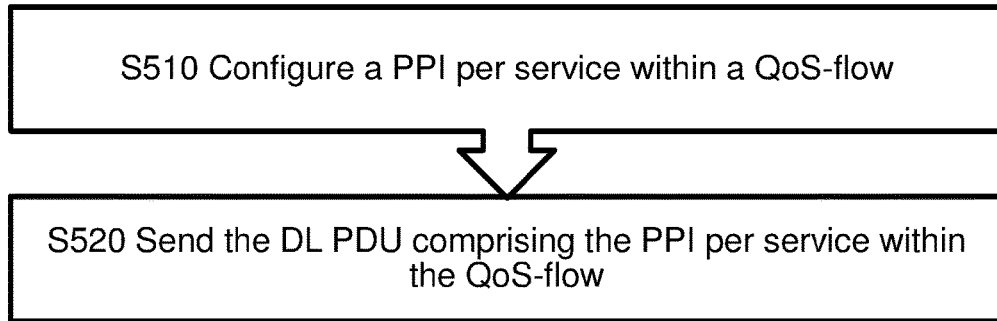
FIG. 5 is a flowchart depicting a method performed by a UPF according to embodiments herein.

The method actions performed by the core network, e.g., the UPF 15 in the core network, for Paging Policy Differentiation (PPD) according to embodiments herein will now be described with reference to a flowchart depicted in FIG. 5, in together with FIG. 6. Thus, the UPF 15 performs actions for PPD. As previously mentioned, the UPF 15 is comprised in the core network CN1. The actions do not have to be taken in the order stated below, but may be taken in any suitable order. Actions performed in some embodiments may be marked with dashed boxes.

Action S510. In order to enable the enhanced PPD herein, the core network CN1, e.g., the UPF 15 in the core network CN1, may configure a PPI associated with a respective service. I.e., the PPI is per service, e.g., one PPI for each (type of) service. For example, a first PPI may be associated with an Instant Message (IM) over the IMS and a second PPI may be associated with voice over the IMS. Further, the two services, i.e. the IM over the IMS and the voice over the IMS in the given example, having the respective first and second PPI, will be mapped on the same QoS-Flow.

Action S520. To implement the enhanced PPD, the core network CN1, e.g., the UPF 15 in the core network CN, may send to the radio network node 12 the UL PDU comprising the PPI associated with the respective service.

Thanks to the PPI per service within the QoS-flow, according to embodiments herein paging policies are further differentiated for different services within the same QoS-flow.

The enhanced Paging Policy Differentiation (PPD) will now be further described. The embodiments may comprise two parts as below.

1. The paging policy indicator may be added to the NG-U interface:

The NG-U interface is defined in the 3GPP TS 38.415 standard document. The paging policy indicator may be included for example in the DL PDU Session Information frame that is sent from the UPF 15 to the CU-UP 12b and may carry information for the delivery of the DL PDU. The frame format is shown in FIG. 7. One option could be for example to use the spare bits (indicated as bold in FIG. 7) in this frame for including the PPI or another identifier for the paging policy.

2. The paging policy may be added into the DL Data Notification message as shown in FIG. 8.

Once the CU-UP 12b receives a DL PDU Session Information frame or in general a DL PDU over the NG-U interface, e.g., for an inactive UE 10, it may extract the paging priority indicator and trigger a DL Data Notification procedure toward the CU-CP 12a.

The DL Data Notification message may be extended to include the paging priority indicator. A possible solution to extend the DL Data Notification message is shown in FIG. 8.

The DL Data Notification message may be sent from the gNB-CU-UP, e.g. the CU-UP 12*b* of the radio network node 12, to the gNB-CU-CP, e.g. the CU-CP 12*a* of the radio network node 12.

Once the CU-CP 12*a* receives this message, it may trigger RAN paging with the indicated paging priority indicator, which will be defined for the specific service from which the DL data is originated.

In some embodiments, the UE 10, the gNB 12 and the UPF 15 are illustrated as examples of a wireless device, a radio network node and an entity in a core network, respectively. However the skilled person will appreciate that the disclosed embodiments are equally applicable to any wireless device, any radio network node, and any entity in a core network CN1 as in FIG. 3*a*.

Figure 9:
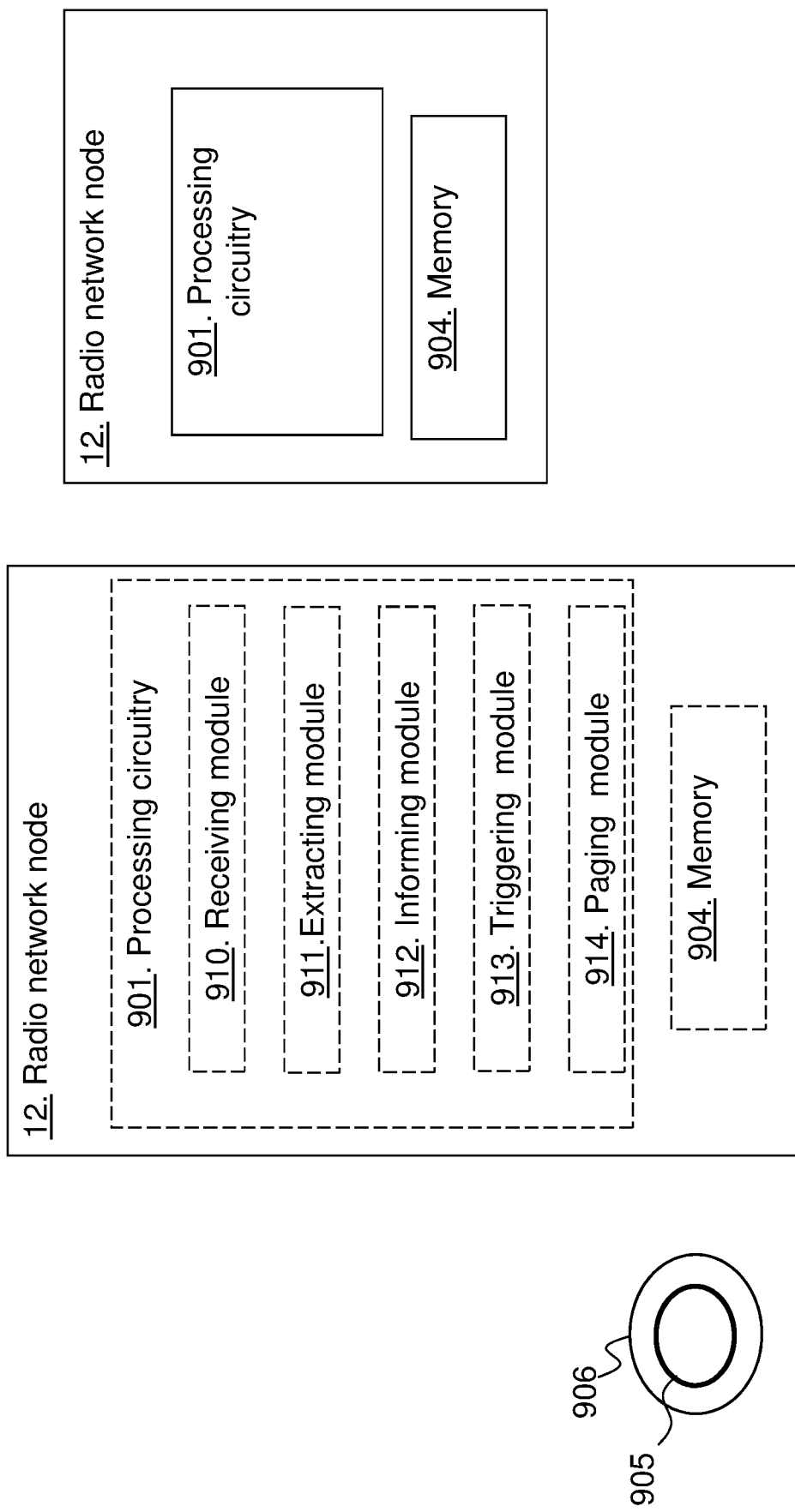
FIG. 9 is a block diagram depicting a radio network node according to embodiments herein.

FIG. 9 is a block diagram depicting the radio network node 12 in a radio access network RAN1 for Paging Policy Differentiation (PPD) according to embodiments herein.

The radio network node 12 may comprise processing circuitry 901, e.g. one or more processors, configured to perform the methods herein.

The radio network node 12 may comprise the Central Unit User Plane (CU-UP) 12*b* and the Central Unit Control Plane (CU-CP) 12*a* (shown in FIG. 3*b*).

The radio network node 12 may comprise a receiving module 910, e.g. a receiver or transceiver. The radio network node 12, the processing circuitry 901, the receiving module 910 and/or the CU-UP 12*b* may be configured to receive the DL PDU with the PPI associated with the respective service from the core network CN1. The DL PDU may be associated with a wireless device 10, namely informing and/or notifying the wireless device 10 about an event. The DL PDU may be comprised in a Quality of Service (QoS)-flow. The DL PDU may comprise a Paging Policy Indicator (PPI) per service within the QoS-flow.

The DL PDU may be any frame transmitted from the core network CN1 to the radio network node 12. The PPI may be carried in any field of the DL PDU. According to an unlimited example shown in FIG. 7, the DL PDU may be a DL PDU session information frame, and the PPI may be carried in a spare field of the DL PDU session information frame.

The radio network node 12 may comprise an extracting module 911. The radio network node 12, the processing circuitry 901, the extracting module 911 and/or the CU-UP 12*b* may be configured to extract, i.e., determine the PPI carried in the DL PDU.

The radio network node 12 may comprise an informing module 912. The radio network node 12, the processing circuitry 901, the informing module 912 and/or the CU-UP 12*b* may be configured to inform the CU-CP 12*a* of the PPI. The PPI may be informed by using any message, e.g., a DL data notification message as shown in FIG. 8.

The radio network node 12 may comprise a triggering module 913. The radio network node 12, the processing circuitry 901, the triggering module 913 and/or the CU-CP 12*a* may be configured to trigger the paging of the wireless device 10.

The radio network node 12 may comprise a paging module 914. The radio network node 12, the processing circuitry 901, the paging module 914 and/or the CU-CP 12*a* may be configured to perform the paging of the wireless device 10 according to the PPI per service within the QoS-flow.

The radio network node 12 may further comprise a memory 904. The memory comprises one or more units to be used to store data on, such as the PPI, DL PDU, frame, and/or the message to perform the methods disclosed herein when being executed, and similar. Thus, the radio network node 12 may comprise the processing circuitry and the memory, said memory comprising instructions executable by said processing circuitry whereby said radio network node 12 is operative to perform the methods herein.

The methods according to the embodiments described herein for the radio network node 12 are respectively implemented by means of e.g. a computer program 905 or a computer program product 905, comprising instructions, i.e., software code portions, which, when executed on at least one processor, cause the at least one processor to carry out the actions described herein, as performed by the radio network node 12. The computer program product 905 may be stored on a computer-readable storage medium 906, e.g. a disc, USB or similar. The computer-readable storage medium 906, having stored thereon the computer program product 905, may comprise the instructions which, when executed on at least one processor, cause the at least one processor to carry out the actions described herein, as performed by the radio network node 12. In some embodiments, the computer-readable storage medium may be a non-transitory computer-readable storage medium.

Figure 10:
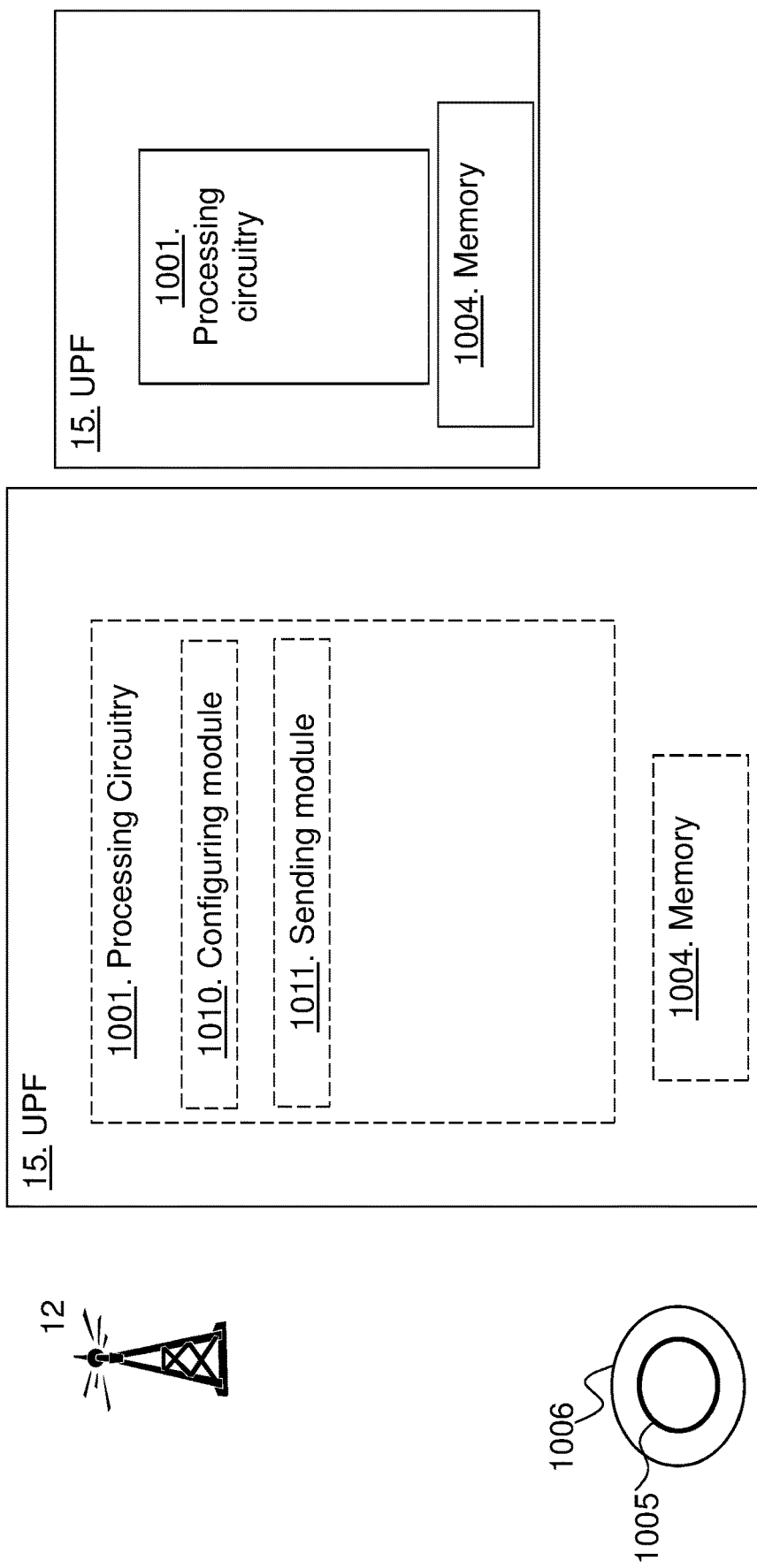
FIG. 10 is a block diagram depicting a UPF according to embodiments herein.

FIG. 10 is a block diagram depicting by the core network CN1, e.g., the UPF 15 in the core network CN1, for Paging Policy Differentiation (PPD) according to embodiments herein.

The core network CN1, e.g., the UPF 15 in the core network CN1, may comprise processing circuitry 1001, e.g. one or more processors, configured to perform the methods herein.

The core network CN1, e.g., the UPF 15 in the core network CN1, may comprise a configuring module 1010. The core network CN1, e.g., the UPF 15 in the core network CN1, the processing circuitry 1001 and/or the configuring module 1010 may configured to configure PPI per service, i.e., configure one PPI for each type of service.

The core network CN1, e.g., the UPF 15 in the core network CN1, may comprise a sending module 1011, e.g. a transmitter or a transceiver. The core network CN1, e.g., the UPF 15 in the core network CN1, the processing circuitry 1001 and/or the sending module 1011 may further configured to send to the radio network node 12 the UL PDU comprising the PPI per service within the QoS-flow.

The core network CN1, e.g., the UPF 15 in the core network CN1, may further comprise a memory 1004. The memory comprises one or more units to be used to store data on, such as UL grants, data, information relating to the DL PDUs, the services, the paging indicators, the wireless device and/or information relating to the radio network node to perform the methods disclosed herein when being executed, and similar. Thus, the core network CN1, e.g., the UPF 15 in the core network CN1, may comprise the processing circuitry and the memory, said memory comprising instructions executable by said processing circuitry whereby said radio network node is operative to perform the methods herein.

The methods according to the embodiments described herein for the core network CN1, e.g., the UPF 15 in the core network CN1, are respectively implemented by means of e.g. a computer program 1005 or a computer program product 1005, comprising instructions, i.e., software code portions, which, when executed on at least one processor, cause the at least one processor to carry out the actions described herein, as performed by the core network CN1, e.g., the UPF 15 in the core network CN1. The computer program product 1005 may be stored on a computer-readable storage medium 1006, e.g. a disc or similar. The computer-readable storage medium 1006, having stored thereon the computer program product 1005, may comprise the instructions which, when executed on at least one processor, cause the at least one processor to carry out the actions described herein, as performed by the core network CN1, e.g., the UPF 15 in the core network CN1. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single Application-Specific Integrated Circuit (ASIC), or in two or more separate devices with appropriate hardware and/or software interfaces between them. Several of the functions may be implemented on a processor shared with other functional components of an UPF, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, Digital Signal Processor (DSP) hardware, Read-Only Memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 11:
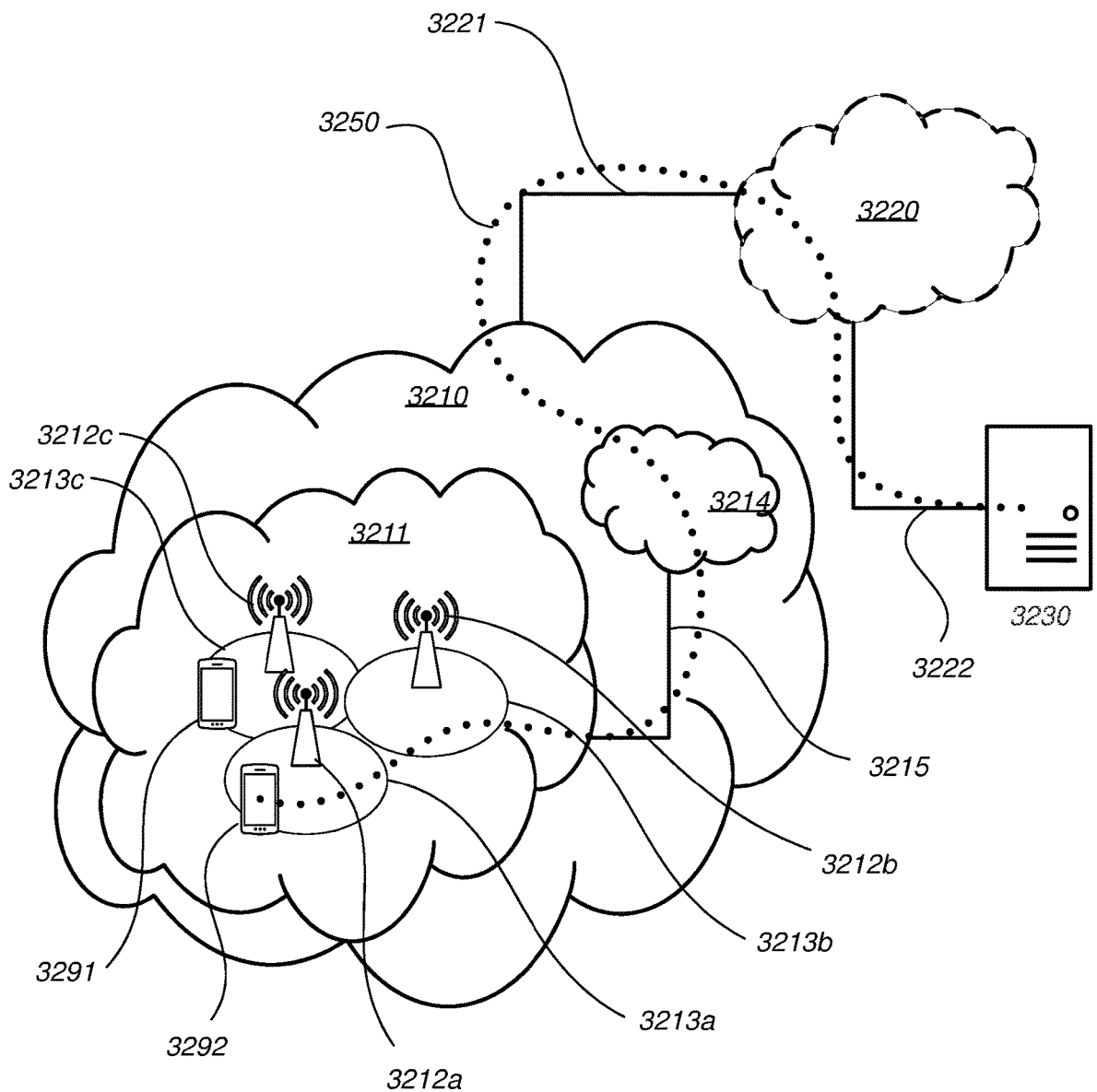

With reference to FIG. 11, in accordance with an embodiment, a communication system includes a telecommunication network 3210, such as a 3GPP-type cellular network, which comprises an access network 3211, such as the radio access network RAM, and a core network 3214, such as the core network CN1. The access network 3211 comprises a plurality of base stations 3212a, 3212b, 3212c, such as the radio network node 12, NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
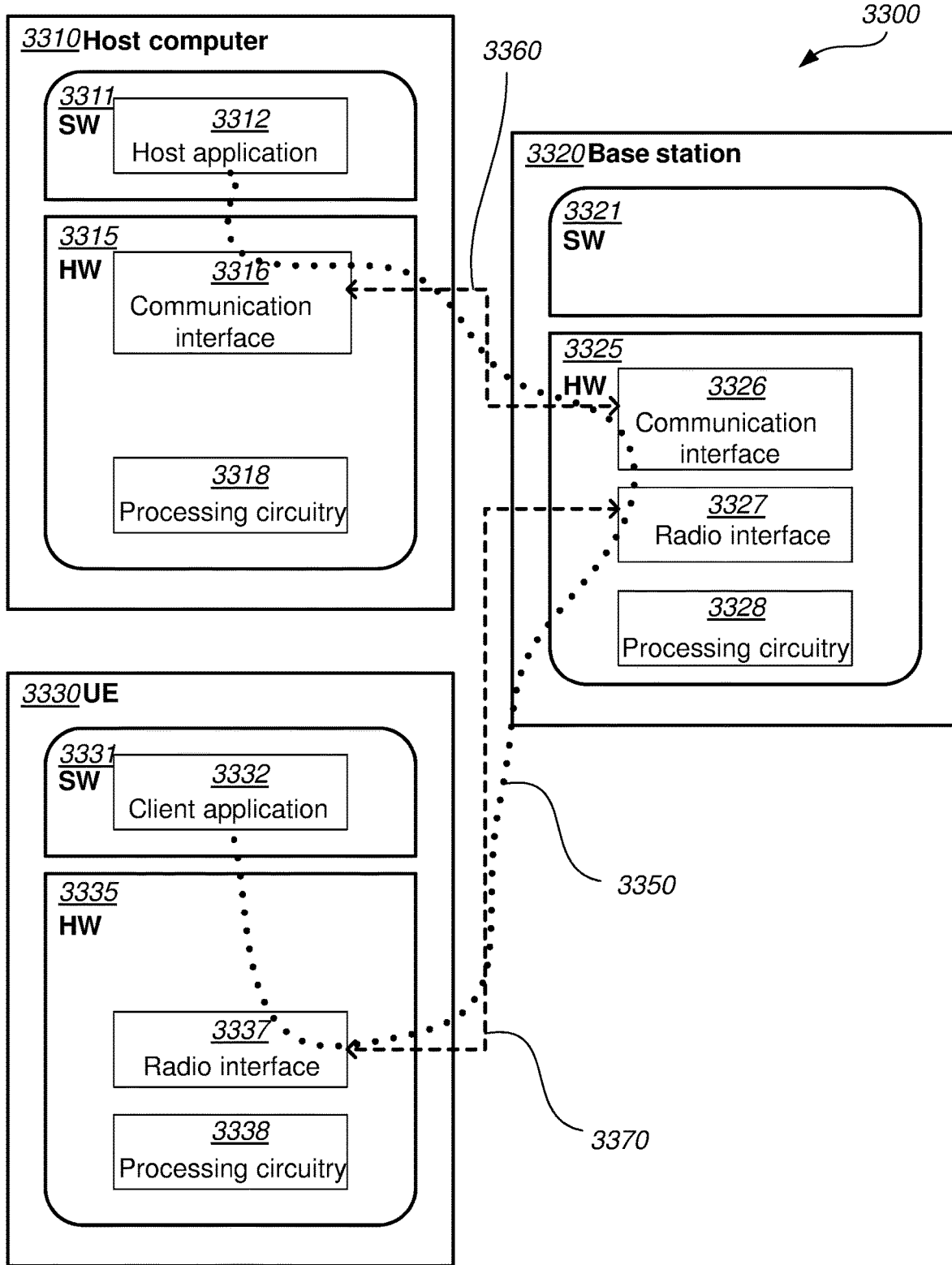

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve transmissions as number of transitions between states may be reduced and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station and a UE which may be those described with reference to FIG. 11 and FIG. 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIG. 11 and FIG. 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 15, 16:
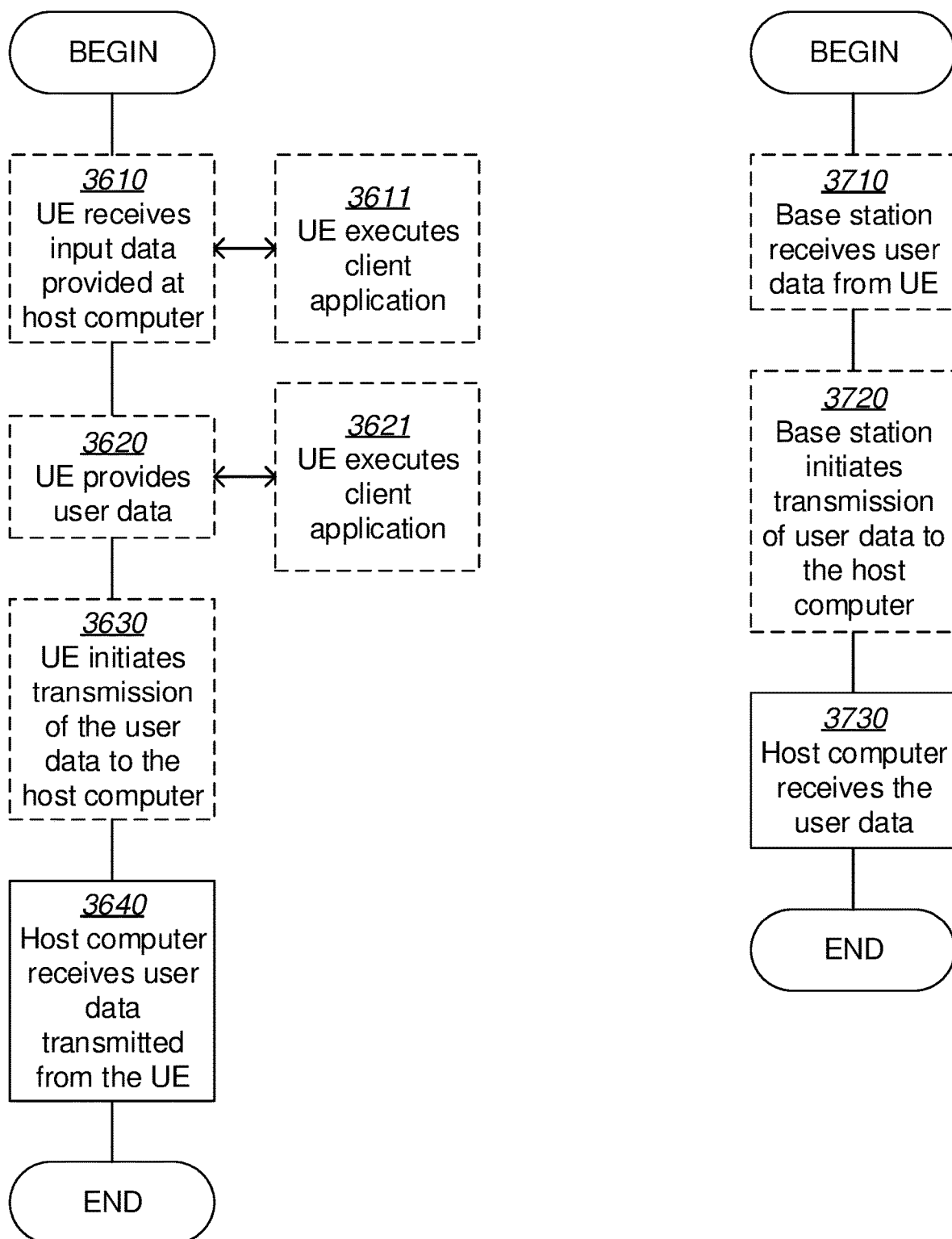

FIG. 15 is a flowchart illustrating a method implemented in a communication system, in accordance with one embodiment. The communication system includes a host computer, a base station and a UE which may be those described with reference to FIG. 11 and FIG. 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIG. 11 and FIG. 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

MORE EMBODIMENTS

Group A Embodiments

1. A method performed by a radio network node in a radio access network for paging policy differentiation (PPD), the method comprising:
   receiving from a core network, a Downlink (DL) Protocol Data Unit (PDU) associated with a wireless device, wherein the DL PDU is comprised in a Quality of Service (QoS)-flow, the DL PDU is originated from a respective service, and the DL PDU comprises a Paging Policy Indicator (PPI) associated with the respective service; and
   paging the wireless device according to the PPI associated with the respective service.
   For example, the DL PDU is comprised in a Quality of Service (QoS)-flow, wherein the QoS-flow comprises DL PDUs, each DL PDU is originated from a respective service, and wherein DL PDU comprised in the QoS-flow comprises a Paging Policy Indicator (PPI) associated with the respective service.
2. The method of the embodiment 1, the method further comprising any one or more of:
   extract, e.g., by a Central Unit User Plane (CU-UP) of the radio network node, the PPI;
   informing, e.g., a Central Unit Control Plane (CU-CP) of the radio network node, of the PPI, the informing is performed, e.g., by the CU-UP; and
   triggering, e.g., by the CU-CP, the paging.
3. The method of the embodiment 2, the method further comprising:
   informing, e.g., the CU-CP, of the PPI by using a DL data notification message via an E1 interface, the informing is performed, e.g., by the CU-UP.
4. The method of any of the previous embodiments, the method further comprising:
   receiving, e.g., by a central unit user plane (CU-UP) of the radio network node, the DL PDU, e.g., from a user plane function (UPF) in the core network, e.g., via a new generation user plane (NG-U) interface.

Group B Embodiments

5. A method performed by a user plane function (UPF) in a core network for paging policy differentiation (PPD), the method comprising:
   sending a downlink (DL) protocol data unit (PDU) associated with a wireless device to a radio network node which is in a radio access network, wherein the DL PDU is comprised in a Quality of Service (QoS)-flow, the DL PDU is originated from a respective service, and the DL PDU comprises a Paging Policy Indicator (PPI) associated with the respective service.
6. The method of the embodiment 5, the method further comprising:
   sending the DL PDU to a central unit user plane (CU-UP) of the radio network node, via a new generation user plane (NG-U) interface.

Group C Embodiments

7. A radio network node in a radio access network for paging policy differentiation (PPD), the radio network node is configured to:
   receive from a core network, a Downlink (DL) Protocol Data Unit (PDU) associated with a wireless device, wherein the DL PDU is comprised in a Quality of Service (QoS)-flow, the DL PDU is originated from a respective service, and the DL PDU comprises a Paging Policy Indicator (PPI) associated with the respective service; and
   perform paging the wireless device according to the PPI associated with the respective service.
8. The radio network node of the embodiment 7, the radio network node is further configured to:
   extract, e.g., by a Central Unit User Plane (CU-UP) of the radio network node, the PPI;
   inform, e.g., a Central Unit Control Plane (CU-CP) of the radio network node, of the PPI, the informing is performed, e.g., by the CU-UP; and
   trigger, e.g., by the CU-CP, the paging.
9. The radio network node of the embodiment 8, the radio network node is further configured to:
   informing, e.g., the CU-CP, of the PPI by using a DL data notification message via an E1 interface, the informing is performed, e.g., by the CU-UP.
10. The radio network node of any one of the embodiments 7-9, the radio network node is further configured to:

receiving, e.g., by a central unit user plane (CU-UP) of the radio network node, the DL PDU, e.g., from a user plane function (UPF) in the core network, e.g., via a new generation user plane (NG-U) interface.

Group D Embodiments

11. A user plane function (UPF) in a core network for paging policy differentiation (PPD), the UPF is configured to:
send a downlink (DL) protocol data unit (PDU) associated with a wireless device to a radio network node which is in a radio access network, wherein the DL PDU is comprised in a Quality of Service (QoS)-flow, the DL PDU is originated from a respective service, and the DL PDU comprises a Paging Policy Indicator (PPI) associated with the respective service.
12. The UPF of the embodiment 11, the UPF is further configured to:
send the DL PDU to a central unit user plane (CU-UP) of the radio network node, via a new generation user plane (NG-U) interface.

Group E Embodiments

13. A computer program product comprising instructions, which, when executed on at least one processor, cause the at least one processor to perform any of the steps of any of the Group A embodiments, as performed by the radio network node, or to perform any of the steps of any of the Group B embodiments, as performed by the UPF.
14. A computer-readable storage medium, having stored thereon a computer program product comprising instructions which, when executed on at least one processor, cause the at least one processor to perform any of the steps of any of the Group A embodiments, as performed by the radio network node, or to perform any of the steps of any of the Group B embodiments, as performed by the UPF.
15. A radio network node comprising processing circuitry configured to:
receive from a core network, a Downlink (DL) Protocol Data Unit (PDU) associated with a wireless device, wherein the DL PDU is comprised in a Quality of Service (QoS)-flow, the DL PDU is originated from a respective service, and the DL PDU comprises a Paging Policy Indicator (PPI) associated with the respective service; and
perform paging the wireless device according to the PPI associated with the respective service.
16. A user plane function (UPF) in a core network comprising processing circuitry configured to:
send a downlink (DL) protocol data unit (PDU) associated with a wireless device to a radio network node which is in a radio access network, wherein the DL PDU is comprised in a Quality of Service (QoS)-flow, the DL PDU is originated from a respective service, and the DL PDU comprises a Paging Policy Indicator (PPI) associated with the respective service.

Numbered Example Embodiments

US1. A radio network node for Paging Policy Differentiation, PPD, wherein the radio network node is configured to be comprised in a radio access network and wherein the radio network node comprises a processor and a memory, said memory containing instructions executable by said processor whereby the radio network node is operative to:
receive from a core network a Downlink, DL, Protocol Data Unit, PDU, associated with a wireless device, wherein the DL PDU is comprised in a Quality of Service, QoS, -flow, wherein the DL PDU is originated from a respective service, and wherein the DL PDU comprises a Paging Policy Indicator, PPI, associated with the respective service;
extract the PPI by means of a Central Unit User Plane, CU-UP, of the radio network node;
by means of the CU-UP, inform a Central Unit Control Plane, CU-CP, of the radio network node about the PPI;
by means of the CU-CP, trigger paging of the wireless device; and
perform paging the wireless device according to the PPI associated with the respective service.
US2. The radio network node of US1, further being operative to:
inform the CU-CP of the PPI by using a DL data notification message via an E1 interface, wherein the informing is performed by the CU-UP.
US3. The radio network node of US1 or US2, further being operative to:
receive, by the CU-UP of the radio network node and via a New Generation User plane, NG-U, interface, the DL PDU from a user plane function, UPF, in the core network.
US4. A user Plane Function, UPF, for Paging Policy Differentiation, PPD, wherein the UPF is configured to be comprised in a Core Network and wherein the UPF comprises a processor and a memory, said memory containing instructions executable by said processor whereby the UPF is operative to:
send a downlink, DL, Protocol Data Unit, PDU, associated with a wireless device to a radio network node which is in a radio access network, wherein the DL PDU is comprised in a Quality of Service, QoS, -flow, wherein the DL PDU is originated from a respective service, and wherein the DL PDU comprises a Paging Policy Indicator, PPI, associated with the respective service.
US5. The UPF of US4, further being operative to:
send the DL PDU to a Central Unit User Plane, CU-UP, of the radio network node, via a New Generation User plane, NG-U, interface.
CN1. A radio network node (12) for Paging Policy Differentiation, PPD, wherein the radio network node (12) is configured to be comprised in a radio access network (RAN1) and wherein the radio network node (12) comprises:
a receiving module (910) configured to receive from a Core Network (CN1), a Downlink, DL; Protocol Data Unit, PDU, associated with a wireless device (10), wherein the DL PDU is comprised in a Quality of Service, QoS, -flow, the DL PDU is originated from a respective service, and the DL PDU comprises a Paging Policy Indicator, PPI, associated with the respective service;
an extracting module (911) configured to extract the PPI by means of a Central Unit User Plane, CU-UP, (12b) of the radio network node (12);

an informing module (912) configured to inform a Central Unit Control Plane, CU-CP (12a), of the radio network node (12) about the PPI;
a triggering module (913) configured to trigger paging of the wireless device (10); and
a paging module (914) perform paging of the wireless device (10) according to the PPI associated with the respective service.

CN2. The radio network node (12) of CN1, wherein informing module (912) is further configured to:
inform the CU-CP (12a) about the PPI by using a DL data notification message via an E1 interface.

CN3. The radio network node (12) of any one of CN1 or CN2, wherein the receiving module (910) is further configured to:
by a Central Unit User Plane, CU-UP, (12b) of the radio network node (12), receive the DL PDU from a User Plane Function, UPF, (15) in the core network (CN1) via a New Generation User plane, NG-U, interface.

CN4. A User Plane Function, UPF, (15) in a Core Network (CN1) for Paging Policy Differentiation, PPD, wherein the UPF (15) comprises:
a sending module (1011) configured to send a downlink, DL, Protocol Data Unit, PDU, associated with a wireless device (10) to a radio network node (12) which is in a radio access network (RAM), wherein the DL PDU is comprised in a Quality of Service, QoS, -flow, wherein the DL PDU is originated from a respective service, and wherein the DL PDU comprises a Paging Policy Indicator, PPI, associated with the respective service.

CN5. The UPF (15) of CN4, wherein the sending module (1011) is further configured to:
send the DL PDU to a Central Unit User Plane, CU-UP, (12b) of the radio network node (12) via a New Generation User plane, NG-U, interface.

The invention claimed is:

1. A method performed by a radio network node for paging policy differentiation (PPD), wherein the radio network node is comprised in a radio access network and wherein the method comprises:
receiving from a core network, a downlink (DL) protocol data unit (PDU) associated with a wireless device, wherein the DL PDU is comprised in a Quality of Service flow (QoS flow), wherein the DL PDU is originated from a respective service, and
wherein the DL PDU comprises a paging policy indicator (PPI) associated with the respective service;
extracting the PPI by means of a central unit-user plane (CU-UP) of the radio network node;
by means of the CU-UP, informing a central unit-control plane (CU-CP) of the radio network node about the PPI;
by means of the CU-CP, triggering paging of the wireless device; and
paging the wireless device according to the PPI associated with the respective service.

2. The method of claim 1, further comprising:
informing the CU-CP of the PPI by using a DL data notification message via an E1 interface, wherein the informing is performed by the CU-UP.

3. The method of claim 1, further comprising:
receiving, by the CU-UP of the radio network node and via a New Generation User plane (NG-U) interface, the DL PDU from a user plane function (UPF) in the core network.

4. A method performed by a user plane function (UPF) for paging policy differentiation (PPD), wherein the method comprises:
sending a downlink (DL) protocol data unit (PDU) associated with a wireless device to a radio network node in a radio access network, wherein the DL PDU is comprised in a quality-of-service flow (QoS flow), wherein the DL PDU is originated from a respective service, and wherein the DL PDU comprises a paging policy indicator (PPI) associated with the respective service.

5. The method of claim 4, further comprising:
sending the DL PDU to a central unit-user plane (CU-UP) of the radio network node, via a New Generation User plane (NG-U) interface.

6. A radio network node for paging policy differentiation (PPD), wherein the radio network node is configured to be comprised in a radio access network and comprises processing circuitry configured to:
receive from a core network, a downlink (DL) protocol data unit (PDU) associated with a wireless device, wherein the DL PDU is comprised in a quality-of-service flow (QoS flow), the DL PDU is originated from a respective service, and the DL PDU comprises a paging policy indicator (PPI) associated with the respective service;
extract the PPI by means of a central unit-user plane (CU-UP) of the radio network node;
by means of the CU-UP, inform a central unit-control plane (CU-CP) of the radio network node about the PPI;
by means of the CU-CP, trigger paging of the wireless device; and
perform paging of the wireless device according to the PPI associated with the respective service.

7. The radio network node of claim 6, wherein the radio network node is further configured to:
by means of the CU-UP, inform the CU-CP about the PPI by using a DL data notification message via an E1 interface.

8. The radio network node of claim 6, wherein the radio network node is further configured to:
by the CU-UP of the radio network node, receive the DL PDU from a user plane function (UPF) in the core network via a New Generation User plane (NG-U) interface.

9. A user plane function (UPF) for paging policy differentiation (PPD), wherein the UPF is configured to be comprised in a core network and wherein the UPF comprises processing circuitry configured to:
send a downlink (DL) protocol data unit (PDU) associated with a wireless device to a radio network node that is in a radio access network, wherein the DL PDU is comprised in a quality-of-service flow (QoS flow), wherein the DL PDU is originated from a respective service, and wherein the DL PDU comprises a paging policy indicator (PPI) associated with the respective service.

10. The UPF of claim 9, wherein the UPF is further configured to:
send the DL PDU to a central unit-user plane (CU-UP) of the radio network node via a New-Generation User plane (NG-U) interface.

* * * * *